US011310043B2

(12) United States Patent
Costello et al.

(10) Patent No.: US 11,310,043 B2
(45) Date of Patent: Apr. 19, 2022

(54) FREQUENCY ENCRYPTION FOR COMMUNICATION SIGNALS

(71) Applicants: Rolls-Royce Corporation, Indianapolis, IN (US); Rolls-Royce North American Technologies, Inc., Indianapolis, IN (US)

(72) Inventors: John Joseph Costello, Indianapolis, IN (US); Richard Joseph Skertic, Carmel, IN (US); Wayne Thomas Padgett, Sr., Terre Haute, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 574 days.

(21) Appl. No.: 16/239,430

(22) Filed: Jan. 3, 2019

(65) Prior Publication Data
US 2020/0220722 A1    Jul. 9, 2020

(51) Int. Cl.
*H04L 9/08* (2006.01)
*H03H 17/02* (2006.01)
*H03H 17/04* (2006.01)
*H04L 29/06* (2006.01)

(52) U.S. Cl.
CPC ....... *H04L 9/0875* (2013.01); *H03H 17/0294* (2013.01); *H03H 17/04* (2013.01); *H04L 63/0428* (2013.01); *H04L 2463/041* (2013.01)

(58) Field of Classification Search
CPC .............. H04L 9/0875; H04L 63/0428; H04L 2463/041; H03H 17/0294; H03H 17/04; H04K 1/10
See application file for complete search history.

(56) References Cited

U.S. PATENT DOCUMENTS

| 6,683,953 | B1 * | 1/2004 | Kasahara | H04L 9/30 380/28 |
| 6,914,637 | B1 * | 7/2005 | Wolf | H04N 21/2383 348/473 |
| 7,388,497 | B1 * | 6/2008 | Corbett | G06K 7/0008 340/572.1 |
| 7,672,453 | B1 * | 3/2010 | Matolak | H04K 1/04 380/35 |
| 9,077,577 | B1 * | 7/2015 | Ashrafi | H04W 12/041 |

(Continued)

OTHER PUBLICATIONS

F. Formaggio, S. Tomasin, G. Caparra, S. Ceccato and N. Laurenti, "Authentication of Galileo GNSS Signal by Superimposed Signature with Artificial Noise," 2018 26th European Signal Processing Conference (EUSIPCO), 2018, pp. 2573-2577.*

(Continued)

*Primary Examiner* — David Garcia Cervetti
(74) *Attorney, Agent, or Firm* — Shumaker & Sieffert, P.A.

(57) ABSTRACT

A receiver in a communication system may include a buffer and hardware. The buffer may be configured to store a communication signal comprising one or more pulses representative of data. The hardware may be configured to determine whether a data authentication pulse has been superimposed over at least one of the one or more pulses, and authenticate, based on the determination of whether the data authentication pulse has been superimposed over at least one of the one or more pulses, the one or more pulses as a valid representation of the data.

18 Claims, 11 Drawing Sheets

(56) References Cited

U.S. PATENT DOCUMENTS

| | | | | |
|---|---|---|---|---|
| 2002/0034295 | A1* | 3/2002 | Den Boer | H04L 9/0625 380/37 |
| 2007/0025738 | A1* | 2/2007 | Moore | H04B 10/1149 398/189 |
| 2007/0211786 | A1* | 9/2007 | Shattil | H04J 13/00 375/141 |
| 2007/0223934 | A1* | 9/2007 | Osterberg | H04B 10/524 398/159 |
| 2008/0198832 | A1* | 8/2008 | Chester | H04L 63/12 370/343 |
| 2016/0302074 | A1* | 10/2016 | Hekstra | H04L 63/0435 |
| 2016/0323246 | A1* | 11/2016 | Zivkovic | H04W 12/06 |
| 2017/0026095 | A1* | 1/2017 | Ashrafi | H04L 9/0852 |
| 2017/0150347 | A1* | 5/2017 | Kowalevicz | H04L 9/0891 |
| 2017/0150348 | A1* | 5/2017 | Kowalevicz | H04L 9/0816 |
| 2017/0331583 | A1* | 11/2017 | Golcher Ugalde | H04L 9/3263 |
| 2018/0262277 | A1* | 9/2018 | Koksal | H04L 27/2613 |
| 2019/0088165 | A1* | 3/2019 | Fleizach | H04K 1/003 |
| 2019/0385057 | A1* | 12/2019 | Litichever | H04L 63/1416 |

OTHER PUBLICATIONS

Response to Communication pursuant to Rule 69 dated Jul. 13, 2020, from counterpart European Application No. 19215914.3, filed Dec. 18, 2020, 63 pp.

Extended Search Report from counterpart European Application No. 19215914.3, dated May 19, 2020, 6 pp.

"Fourier Series," Wikipedia, the free encyclopedia, retrieved from https://en.wikipedia.org/wiki/Fourier_series, Dec. 18, 2018, 12 pp.

Yoosuf, "The Many, Many Ways that Cryptographic Software can Fail," medium.freecodecamp.org, Jan. 24, 2017, 14 pp.

Al-Tamimi, "Performance Analysis of Data Encryption Algorithms," retrieved from https://www.cse.wustl.edu/~jain/cse567-06/ftp/encryption_perf/, Dec. 18, 2018, 14 pp.

Examination Report from counterpart European Application No. 19215914.3 dated Dec. 10, 2021, 6 pp.

* cited by examiner

FREQUENCY ENCRYPTION FOR COMMUNICATION SIGNALS

TECHNICAL FIELD

The disclosure relates to control systems and security features for frequency-based communication control systems.

BACKGROUND

Embedded electrical and computing systems are used in many applications, including manned and unmanned vehicle control systems, as well as other types of control systems. For instance, flight control systems, engine control systems, generator control systems, and the like, are examples of embedded electrical and computing systems. These types of embedded systems may be exposed, during regular operational use, to a variety of different types of hostile cyberattacks. For example, an unauthorized user may try to circumvent access controls to take command of an engine control system of an aircraft, e.g., to induce damage to the engine, or worse, cause the aircraft to crash.

SUMMARY

In one example, the disclosure is directed to a method comprising: receiving, by a receiver, a communication signal comprising one or more pulses representative of data; determining, by the receiver, whether a data authentication pulse has been superimposed over at least one of the one or more pulses; and authenticating, by the receiver and based on the determination of whether the data authentication pulse has been superimposed over at least one of the one or more pulses, the one or more pulses as a valid representation of the data.

In another example, the disclosure is directed to a receiver in a communication system, the receiver comprising: a buffer configured to store a communication signal comprising one or more pulses representative of data; and hardware configured to: determine whether a data authentication pulse has been superimposed over at least one of the one or more pulses; and authenticate, based on the determination of whether the data authentication pulse has been superimposed over at least one of the one or more pulses, the one or more pulses as a valid representation of the data.

In another example, the disclosure is directed to a system comprising: a hardware transmitter configured to: obtain a communication carrier signal that includes one or more pulses representative of data; superimpose, in accordance with a pseudo random sequence, a data authentication signal on top of at least one of the one or more pulses to obtain an encrypted communication signal; and transmit the encrypted communication signal; and a hardware receiver configured to: receive the encrypted communication signal; determine, according to the pseudo random sequence, whether the data authentication pulse has been superimposed over the at least one of the one or more pulses; and authenticate, based on the determination of whether the data authentication pulse has been superimposed over the at least one of the one or more pulses, the one or more pulses as a valid representation of the data.

In another example, the disclosure is directed to a method comprising: obtaining, by a transmitter, a communication signal comprising one or more pulses representative of data; superimposing, by the transmitter, a data authentication pulse on top of at least one of the one or more pulses to obtain an encrypted communication signal; and transmitting, by the transmitter, the encrypted communication signal.

In another example, the disclosure is directed to a transmitter in a communication system, the transmitter comprising: a buffer configured to store an communication signal comprising one or more pulses representative of data; and hardware configured to: superimpose a data authentication pulse on top of at least one of the one or more pulses to obtain an encrypted communication signal; and transmit the encrypted communication signal.

The details of one or more examples are set forth in the accompanying drawings and the description below. Other features, objects, and advantages of the disclosure will be apparent from the description and drawings, and from the claims.

DETAILED DESCRIPTION

Figure 1:
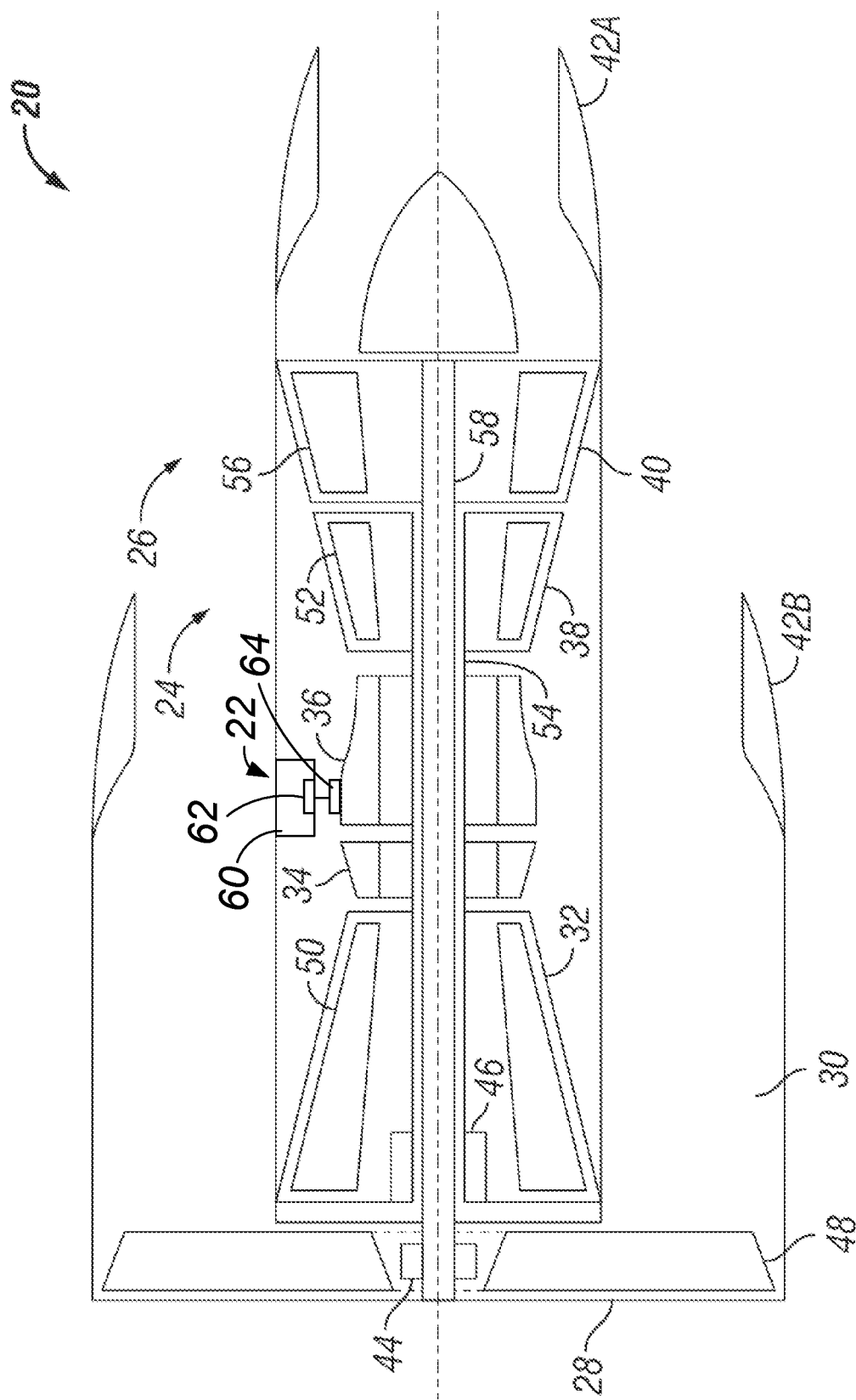
FIG. 1 is a conceptual diagram illustrating an example gas turbine engine that includes an optical system, in accordance with one or more aspects of the present disclosure.

The disclosure describes frequency encryption for communications systems including a receiver and a transmitter, where the transmitter superimposes a data authentication pulse in one or more pulses forming a communication signal to generate an encrypted communication signal. In some examples, the communications system may be an optical communications system. In other examples, the communications system may be a radio frequency (RF) communications system or other electrical communication system. The transmitter outputs the encrypted communications signal in the form of a pulse train (comprising the one or more pulses) to securely transmit data from the transmitter to the receiver. The transmitter outputs the communications signal as electromagnetic energy with a predetermined frequency spectrum.

In some implementations, both the transmitter and the receiver may be configured to identify which of the one or more pulses include the data authentication pulse according to a pseudo random sequence. As such, the transmitter may insert the data authentication signal according to the pseudo random sequence, and the receiver may identify the data authentication signal according to the pseudo random sequence. Moreover, an amplitude of the data authentication pulse may be at least one (and possibly multiple, like three or four) orders of magnitude less than the amplitude of the one or more pulses of the communication signal, thereby potentially reducing the likelihood of detection of the data authentication pulse (and further potentially reducing the likelihood of spoofing the encryption provided by use of the data authentication pulse and compromising the communication system).

The receiver may determine, according to the pseudo random sequence, whether the one or more pulses include the data authentication pulse. Based on the determination of whether the one or more pulses include the data authentication pulse, the receiver may authenticate the one or more pulses as a valid representation of the data. Rather than resort to complicated software-based or software/hardware-based encryption processes that consume significant processing cycles, memory, and other computing resources (including bus bandwidth), the frequency encryption techniques described in this disclosure enable an at least partially hardware-based (and possibly entirely hardware-based) encryption that facilitates (relative to existing encryption processes) more rapid encryption and decryption.

The rapid nature of the frequency-based encryption may not only reduce processor or other computing resource consumption but enable application in contexts, such as control systems, in which encryption could not adequately exist due to time constraints by which signals need to be delivered to maintain operation of, as one example, an aircraft. As such, the frequency encryption techniques described in this disclosure may improve the operation of computing devices, such as control systems, themselves as such systems are more secure and better protect the operation of, as one example, aircrafts from malicious attacks.

The following examples will be described with primary reference to an optical communication system in which the transmitter and receiver are an optical transmitter and an optical receiver, and the communication coupling between the transmitter and receiver is an optical connection, such as a fiber optic cable. It will be understood, however, that the systems and techniques described herein may be applied to other communications systems, such as, for example electrical communication systems, RF communication systems, or the like.

FIG. 1 is a conceptual diagram illustrating an example gas turbine engine 20 that includes an optical system 22, in accordance with one or more aspects of the present disclosure. Gas turbine engine 20 is a primary propulsion engine that provides thrust for flight operations of a vehicle, such as an aircraft, marine craft, or the like. In some examples, gas turbine engine 20 is a two-spool engine having a high pressure (HP) spool 24 and a low pressure (LP) spool 26. In other examples, gas turbine engine 20 may include three or more spools, e.g., may include an intermediate pressure (IP) spool and/or other spools. In some examples, gas turbine engine 20 is a turbofan engine, where LP spool 26 is operative to drive a propulsor in the form of a turbofan (fan) system 28. In other examples, gas turbine engine 20 may not include a LP spool or fan system 28. In some examples, gas turbine engine 20 may include any suitable turbine powered-engine propulsion system, including but not limited to, a turbojet engine or a turboprop engine.

Gas turbine engine 20 includes a fan system 28 in fluid communication with a bypass duct 30 and a compressor system 32. A diffuser 34 is in fluid communication with compressor system 32. A combustion system 36 is fluidically disposed between compressor system 32 and a high pressure (HP) turbine system 38 (e.g., disposed between compressor system 32 and HP turbine system 38 such that air or another fluid may flow from compressor system 32 to combustion system 36 to HP turbine system 38). In some examples, combustion system 36 includes a combustion liner (not shown) that encloses a continuous combustion process. In other examples, combustion system 36 may take other forms, and may be, for example, a wave rotor combustion system, a rotary valve combustion system, a pulse detonation combustion system, or a slinger combustion system, and may employ deflagration and/or detonation combustion processes.

A low pressure (LP) turbine system 40 is fluidically disposed between HP turbine system 38 and a nozzle 42A configured to discharge a core flow of gas turbine engine 20 (e.g., disposed between HP turbine system 38 and nozzle 42A such that air or another fluid may flow from HP turbine system 38 to LP turbine system 40 to nozzle 42A). A nozzle 42B is in fluid communication with bypass duct 30, and operative to transmit a bypass flow generated by fan system 28 around the core of gas turbine engine 20. In other examples, other nozzle arrangements may be used, e.g., a common nozzle for core and bypass flow; a nozzle for core flow, but no nozzle for bypass flow; or another nozzle arrangement.

Fan system 28 includes a fan rotor system 48 having one or more rotors (not shown) that are driven by LP spool 26 of LP turbine system 40. Fan system 28 may include one or more vanes (not shown). Compressor system 32 includes a compressor rotor system 50. In some examples, compressor rotor system 50 includes one or more rotors (not shown) that are powered by HP turbine system 38. High pressure turbine system 38 includes a first turbine rotor system 52. First turbine rotor system 52 includes one or more rotors (not shown) operative to drive compressor rotor system 50. First turbine rotor system 52 is drivingly coupled to compressor rotor system 50 via a shafting system 54.

Low pressure turbine system 40 includes a second turbine rotor system 56. Second turbine rotor system 56 includes one or more rotors (not shown) operative to drive fan rotor system 48. Second turbine rotor system 56 is drivingly coupled to fan rotor system 48 via a shafting system 58. Shafting systems 54 and 58 include a plurality of shafts that may rotate at the same or different speeds and directions. In some examples, only a single shaft may be employed in one or both of shafting systems 54 and 58. Turbine system 40 is operative to discharge the engine 20 core flow to nozzle 42A.

During normal operation of gas turbine engine 20, air is drawn into the inlet of fan system 28 and pressurized by fan rotor system 48. Some of the air pressurized by fan rotor system 48 is directed into compressor system 32 as core flow, and some of the pressurized air is directed into bypass duct 30 as bypass flow. Compressor system 32 further pressurizes the portion of the air received therein from fan system 28, which is then discharged into diffuser 34. Diffuser 34 reduces the velocity of the pressurized air and directs the diffused core airflow into combustion system 36. Fuel is mixed with the pressurized air in combustion system 36, which is then combusted. The hot gases exiting combustion system 36 are directed into turbine systems 38 and 40, which extract energy in the form of mechanical shaft power to drive compressor system 32 and fan system 28 via respective shafting systems 54 and 58.

In some instances, engine 20 may include an electrical machine 44 coupled to LP spool 26, an electrical machine 46 coupled to HP spool 24, or both. Electrical machine 44 and electrical machine 46 may be configured to provide electrical power to aircraft 10 during flight operations, during ground operations, or both. Each of electrical machines 44 and 46 are, in some examples, configured to convert mechanical power to electrical power and to convert electrical power to mechanical power, e.g., as in a motor/generator.

In some examples, one or both of electrical machines 44 and 46 may be configured to only convert mechanical power into electrical power, e.g., as in a generator. Additionally, one or both of electrical machines 44 and 46 may be configured to only convert electrical power into mechanical power, e.g., as in a motor. Further, aircraft 10 may include other electrical systems including, for example, one or more of high heat load electrical systems, electrical power distribution systems, power conversion systems, power electronics, digital electronics, thermal management systems, avionics, and environmental control systems.

Optical system 22 of gas turbine engine 20 includes a first component 60 and a second component 64. First component 60 and second component 64 are optically coupled by an optical interface, such as a fiber optic cable (not labelled in FIG. 1 for ease of illustration purposes). First component 60 may be a central component, such as a controller. Second component 64 may include a remote component, such as a sensor (e.g., temperature, pressure, position, speed, rotational frequency, or the like) or an actuator (e.g., a valve actuator, a linear or rotational actuator, or the like). In this way, optical system 22 may be part or substantially all of a control system for gas turbine engine 20.

Although optical system 22 is illustrated in the context of gas turbine engine 20 in FIG. 1, optical system 22 may be used in any optical-communications based system, including other control system, networking systems, and the like. Further, although the example of FIG. 1 includes an optical system 22 that implements the techniques of this disclosure, in other examples, a gas turbine engine 20 may include an electrical system that that implements the techniques of this disclosure.

First component 60 includes an optical transceiver 62. Optical transceiver 62 may include an optical transmitter and an optical receiver. Alternatively, first component 60 may include separate optical transmitter and optical receiver. Similarly, second component 64 may include an optical transceiver or an optical transmitter and optical receiver.

The optical transmitter may include any light source configured to output light with a selected frequency spectrum. In some examples, the optical transmitter may include a light emitting diode (LED), a vertical cavity surface emitting laser (VCSEL), or the like. In other examples, the optical transmitter may include a plurality of LEDs or VCSELs, each LED or VCSEL outputting light with a different frequency spectrum.

The optical receiver may include any photo detector configured to sense light and produce an electrical signal representative of the sensed light. For example, the optical receiver may include a photodiode or the like.

Although not shown in FIG. 1, each of first component 60 and second component 64 may also include processing circuitry configured to process the electrical signal indicative of the sensed light and to generate electrical signals that the optical transmitter converts to optical signals and outputs.

In accordance with various aspects of the techniques described in this disclosure, first component 60 may generate an encrypted communication signal using frequency encryption. Frequency encryption may enable the first component 60 to insert, or in other words, add a data authentication pulse of a specified frequency, amplitude and possibly dampening factor to a communication signal. First component 60 may, in other words, superimpose the data authentication pulse on top of at least one or more pulses of the communication signal to obtain the encrypted communication signal. The first component 60 may then transmit the encrypted communication signal to, as one example, second component 64.

In this example, second component 64 may receive the encrypted communication signal from first component 60. As such, first component 60 may represent a transmitter (which is to be distinguished from the optical transmitter described above by using the term "electrical transmitter 60") and second component 64 may represent a receiver (which again may be distinguished from the optical receiver described above by using the term "electrical receiver 64").

In any event, electrical transmitter 62 may output the encrypted communications signal in the form of a pulse train (comprising the one or more pulses) to securely transmit data from electrical transmitter 62 to electrical receiver 64. Electrical transmitter 62 outputs the communications signal as electromagnetic energy with a predetermined frequency spectrum.

Both electrical transmitter 62 and electrical receiver 64 may be configured to identify which of the one or more pulses (are to, in the context of electrical transmitter 62) include the data authentication pulse according to a pseudo random sequence (and both electrical transmitter 62 and electrical receiver 64 use the same pseudo random sequence—e.g., by configuring both electrical transmitter 62 and electrical transmitter 64 with the same seed value). In this way, electrical transmitter 62 may insert the data authentication pulse (which may also be referred to as a "data authentication signal") on to one or more of the pulses identified by the pseudo random sequence, and electrical receiver 64 may identify the one or more pulses to which the data authentication pulse was inserted according to the pseudo random sequence.

Moreover, an amplitude of the data authentication pulse may be at least one (and possibly multiple, like three or four) orders of magnitude less than the amplitude of the one or more pulses of the communication signal, thereby potentially reducing the likelihood of detection of the data authentication pulse (and further potentially reducing the likelihood of spoofing the encryption provided by use of the data authentication pulse and compromising the communication system). That is, because the data authentication pulse is at least one order of magnitude less than the one or more pulses of the communication pulses, the data authentication pulse appears to resemble noise or other random pulses, thereby possibly reducing the likelihood of detection unless potential attackers are using sophisticated analysis equipment, which would be difficult to bring onboard an aircraft.

Electrical receiver 64 may determine, according to the pseudo random sequence, whether the one or more pulses include the data authentication pulse. Based on the determination of whether the one or more pulses include the data authentication pulse, electrical receiver 64 may authenticate the one or more pulses as a valid representation of the data. Rather than resort to complicated software-based or software/hardware-based encryption processes that consume significant processing cycles, memory, and other computing resources (including bus bandwidth), the frequency encryption techniques described in this disclosure enable a hardware-based (and possibly entirely hardware-based) encryption that facilitates (relative to existing encryption processes) more rapid encryption and decryption.

The rapid nature of the frequency-based encryption may not only reduce processor or other computing resource consumption but enable application in contexts, such as optical system 22, in which encryption could not adequately exist due to time constraints by which signals need to be delivered to maintain operation of, as one example, an aircraft. As such, the frequency encryption techniques described in this disclosure may improve the operation of computing devices, such as optical system 22, themselves as such systems are more secure and better protect the operation of, as one example, aircrafts from malicious attacks.

Figure 2:
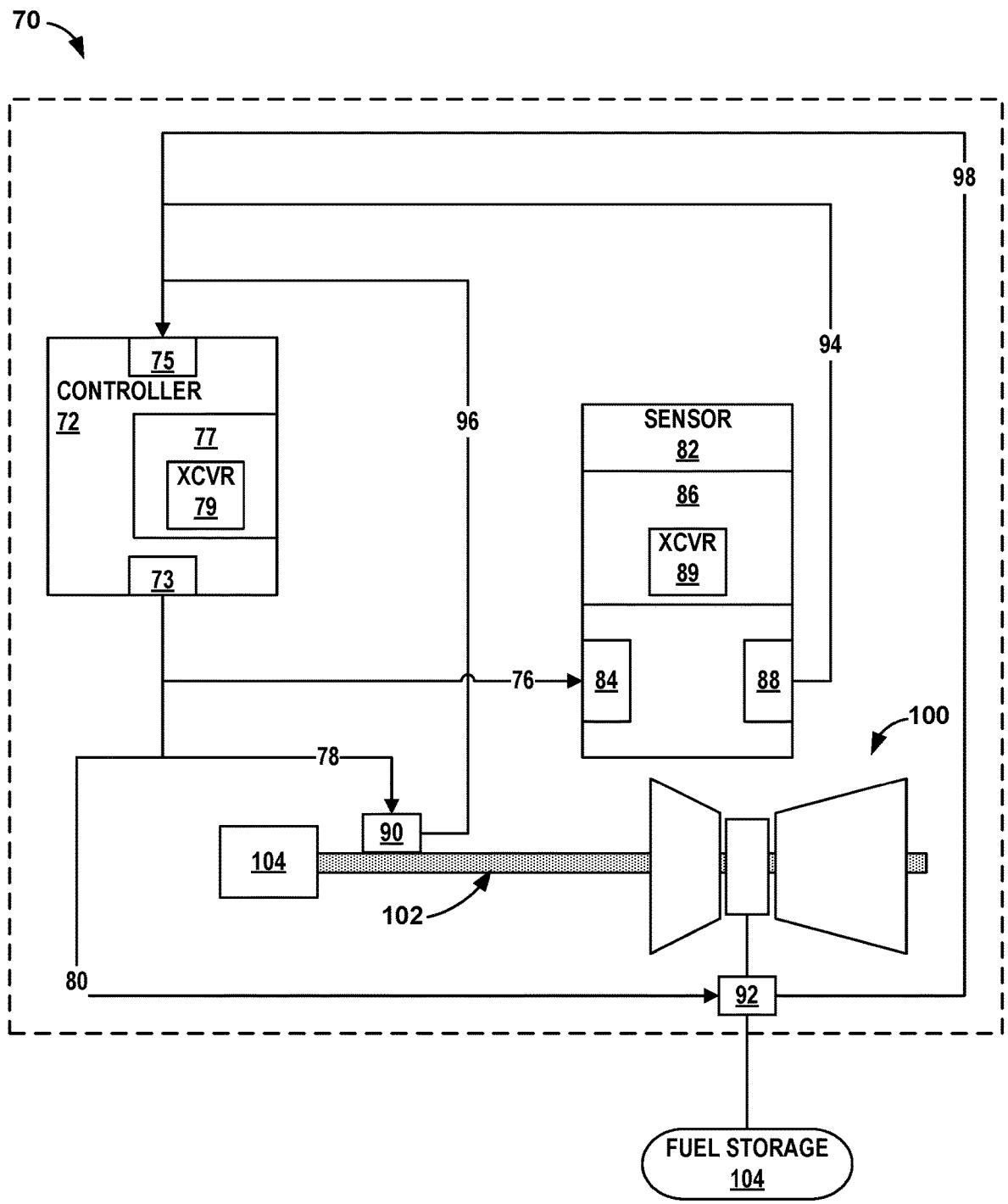
FIG. 2 is a conceptual diagram illustrating an example optical system, in accordance with one or more aspects of the present disclosure.

FIG. 2 is a conceptual diagram illustrating an example optical system 70, in accordance with one or more aspects of the present disclosure. Optical system 70 is an example of optical system 22 of FIG. 1. Optical system 70 includes a controller 72, a first sensor 82, a second sensor 90, and an actuator 92. Controller 72 includes an optical transmitter 73, an optical receiver 75, and processing circuitry 77. First sensor 82 includes an optical receiver 84, processing circuitry 86, and an optical transmitter 88. Second sensor 90 and actuator 92 similarly include a respective optical receiver, processing circuitry, and optical transmitter, although these components are not illustrated in FIG. 2 for clarity.

Optical transmitter 73 of controller 72 is optically coupled to optical receiver 84 of first sensor 82 by first optical connection 76. Optical transmitter 73 of controller 72 is optically coupled to the optical receiver of second sensor 90 by second optical connection 78. Optical transmitter 73 of controller 72 is optically coupled to the optical receiver of actuator 92 by third optical connection 80. Although optical transmitter 73 is shown as a single optical transmitter, in other examples, controller 72 may include a separate optical transmitter for each optical connection, e.g., a separate optical transmitter for each of first optical connection 76, second optical connection 78, and third optical connection 80. Like the optical transmitters described in FIG. 1, optical transmitter 73 may include any suitable device configured to output an optical signal with a predetermined frequency spectrum, such as an LED or a VCSEL.

Optical receiver 75 of controller 72 is optically coupled to optical transmitter 88 of first sensor 82 via fourth optical connection 94. Similarly, optical receiver of controller 72 is optically coupled to the optical transmitters of second sensor 90 and actuator 92 via fifth optical connection 96 and sixth optical connection 98, respectively.

In other examples, rather than the optical connections for the send (optical transmitters) and receive (optical receivers) channels being separate optical connections, the send and receive channels for each respective device pair may be accomplished using a single optical connection. For example, a single optical connection may optically couple controller 72 and first sensor 82. Alternatively, rather than a single optical connection optically connecting a transmit/receive pair, a transmit/receive pair may be optically coupled using a plurality of optical connections. Each optical connection may include a fiber optic cable. The plurality of optical connections, if present, may be accomplished using separate fiber optical cables or separate modes of a multimode fiber.

Controller 72 may include processing circuitry 77, a memory, and input/output hardware, including optical transmitter 73 and optical receiver 75. Examples of processing circuitry 77 may include any one or more of a microcontroller (MCU), e.g., a computer on a single integrated circuit containing a processor core, memory, and programmable input/output peripheral; a microprocessor (μP); e.g. a central processing unit (CPU) on a single integrated circuit (IC); a digital signal processor (DSP); an application specific integrated circuit (ASIC); a field-programmable gate array (FPGA); a system on chip (SoC) or equivalent discrete or integrated logic circuitry. A processor may be integrated circuitry, i.e., integrated processing circuitry, and that integrated processing circuitry may be realized as fixed hardware processing circuitry, programmable processing circuitry and/or a combination of both fixed and programmable processing circuitry. In some examples, controller 72 and/or processing circuitry may include an engine control unit (ECU) or a full authority digital engine control (FADEC).

Processing circuitry 77 may be configured to at least one of perform the functions ascribed to controller 72, process information received from sensors 82 and 90 and actuator 92 via optical receiver 75 and optical connections 94, 96, and 82, and transmit information to sensors 82 and 90 and actuator 92 via optical transmitter 73 and optical connections 76, 78, and 80. Optical transmitter 73 may include any of the optical transmitters described herein, including an LED or a VCSEL. Optical receiver 75 may include any of the optical receivers described herein, including photodiode or the like.

First sensor 82 may include any suitable type of sensor. For examples, first sensor 82 may include a temperature sensor, a pressure sensor, a position sensor, a speed sensor, a rotational frequency sensor, an accelerometer, a gyroscope, a gas detector, a proximity sensor, or the like. First sensor 82 may include a sensor component configured to perform the sensing aspect of first sensor 82, and also may include input/output components, such as optical receiver 84 and optical transmitter 88, and processing circuitry 86. Optical transmitter 88 may include any of the optical transmitters described herein, including an LED or a VCSEL. Optical receiver 84 may include any of the optical receivers described herein, including photodiode or the like.

Processing circuitry 86 may include any one or more of a MCU, a μP, a DSP, an ASIC, a FPGA, a SoC, or equivalent discrete or integrated logic circuitry. Processing circuitry 86 may be configured to at least one of control the sensor component, process information received from the sensor component, and receive and transmit data via optical receiver 84 and optical transmitter 88, respectively.

Second sensor 90 may be similar to or substantially the same as first sensor 82 in that second sensor 90 may include any suitable type of sensor and may include a sensor component configured to perform the sensing aspect of second sensor 90, input/output components, such as an optical receiver and an optical transmitter, and processing circuitry. Second sensor 90 may include the same or a different type of sensor component as first sensor 82. In the example of FIG. 2, second sensor 90 may include a rotational frequency sensor configured to sense a rotational frequency or rotational speed of output shaft 102.

Actuator 92 may include any type of actuator component configured to actuate any type of component. For example, actuator 92 may include a hydraulic actuator, a pneumatic actuator, an electric actuator, or a mechanical actuator. Actuator 92 may be configured to actuate any type of component, such as a valve, a flap, a vane, a nozzle, (e.g., a valve actuator, a linear or rotational actuator, or the like). Like sensors 82 and 90, actuator 92 may include processing circuitry, an optical transmitter, an optical receiver.

Optical system 70 is illustrated in FIG. 2 in the context of a gas turbine engine system, which includes a gas turbine engine 100 coupled to an output shaft 102, which drives a machine 104, such as a propulsor. Gas turbine engine 100 receives fuel from fuel storage 104 via actuator 92 (e.g., a valve). However, optical system 70 may be used in any other context in which two devices communicate using optical signals over optical connections.

The following example will be described with reference to controller 72 and first sensor 82, but it should be understood that similar techniques may be applied by in the reverse direction between controller 72 and first sensor 82, by second sensor 90 and/or actuator 92, or combinations thereof. In other words, the following example assumes that controller 72 operates as a receiver while first sensor 82 operates as a transmitter. However, it should be understood that controller 72 may, in other examples, operate as a transmitter while first sensor 82 operates as a receiver. Further, first sensor 82 may operate as a transmitter and second sensor 90 may operate as a receiver, and so on with regard to any combination of two or more of controller 72, first sensor 82, second sensor 90, and actuator 92.

As further shown in the example of FIG. 2, processing circuitry includes a transceiver (XCVR) 79 that represents either a transmitter or a receiver or both a transmitter and a receiver, which in either case is configured to perform various aspects of the frequency encryption techniques described in this disclosure. Furthermore, processing circuitry 86 may include an XCVR 89 that is similar to, if not substantially the same as, XCVR 79. XCVRs 79 and 89 may be implemented in hardware (e.g., using a digital signal processor—DSP), or a combination of hardware and software.

In the example assumed above in which controller 72 operates as a receiver and first sensor 82 operates as a transmitter, XCVR 89 of first sensor 82 may generate a communication signal (which may also be referred to as a "primary digital signal") that includes a pulse train representative of data. XCVR 89 may use a Fourier series to create the communication signal as a digital, communication pulse train out of a series of odd harmonics. XCVR 89 may utilize the following equation to generate the pulse train, which defines the Fourier series to create a square wave impulse.

$$s_N(x) = \frac{A_0}{2} + \sum_{n=1}^{N} A_n \sin\left(\frac{2\pi n x}{P} + \phi_n\right), \text{ for integer } N \geq 1.$$

In the foregoing equation, $s_N(x)$ is a real-valued function of the real variable x and s is integrable on an interval $[x_0, x_0+P]$. Outside the interval, the series is periodic with period P (frequency 1/P). $s_N(x)$ may be referred to as a period function with period P, where the coefficients $A_n$ denote the amplitudes and the $\phi_n$ denote the phases of the oscillations.

Figure 4A:
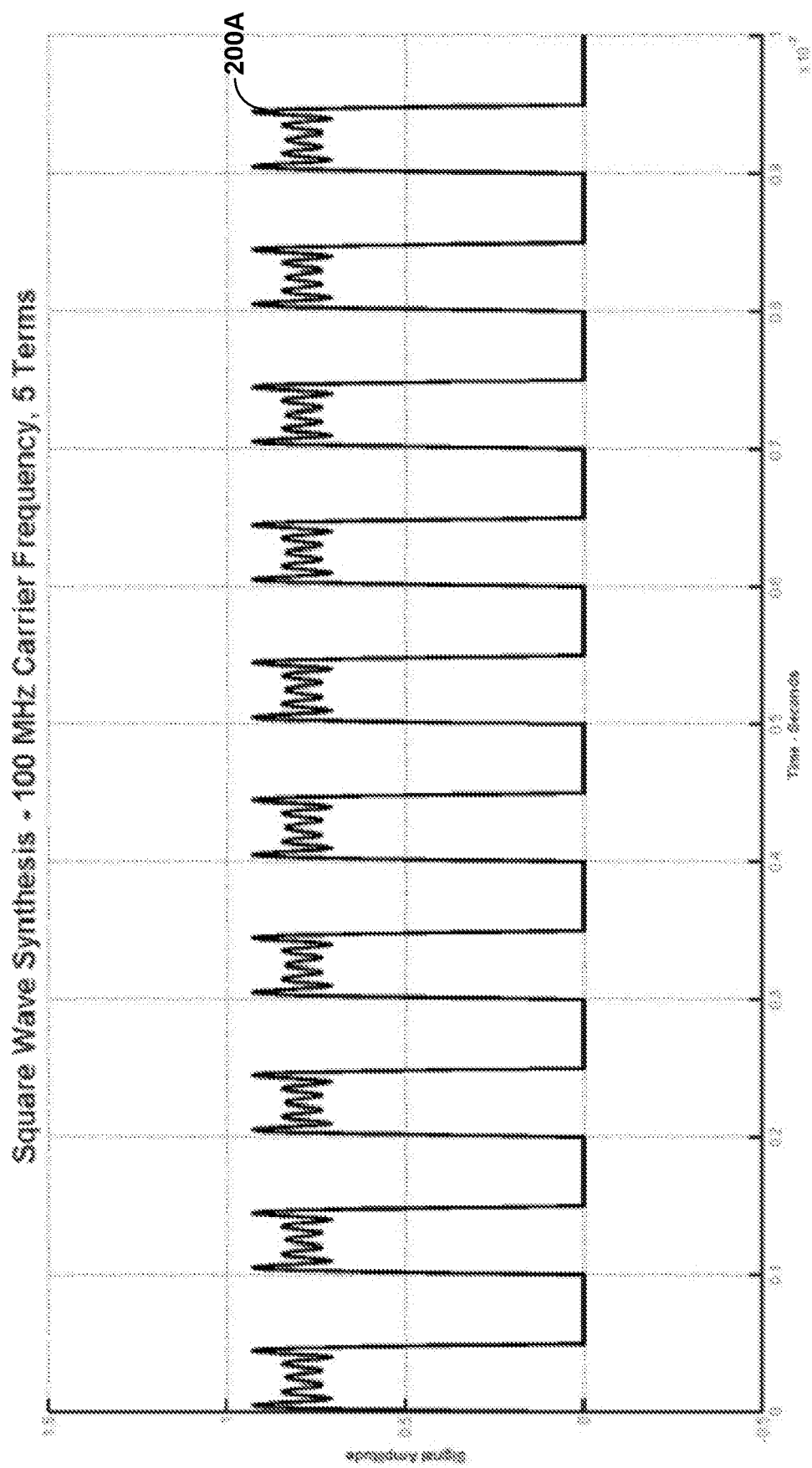
FIGS. 4A and 4B are graphs illustrating examples of the primary digital signal generated in accordance with various aspects of the frequency encryption techniques set forth in this disclosure.
Figure 4B:
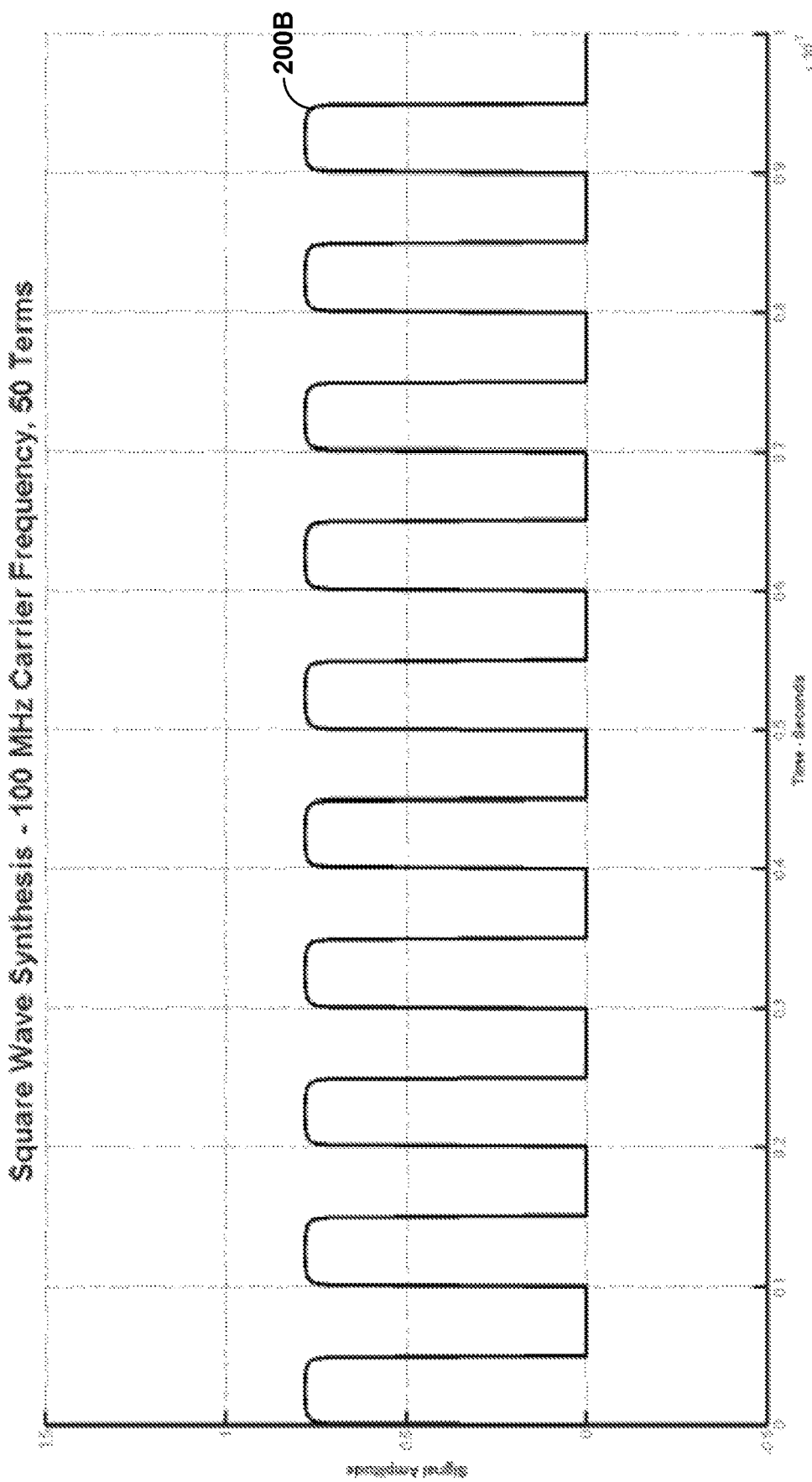

In some examples, XCVR 89 may be configured to generate the primary digital signal (which may also be referred to as a "carrier signal") using a 100 megahertz (MHz) carrier frequency. FIGS. 4A and 4B are graphs illustrating examples of the primary digital signal generated in accordance with various aspects of the frequency encryption techniques set forth in this disclosure. Referring first to the example of FIG. 4A, XCVR 89 generates a primary digital signal 200A using the first five odd harmonics, e.g., 1×, 3×, 5×, 7×, and 9×. Referring next to the example of FIG. 4B, XCVR 89 generates a primary digital signal 200B using the first fifty odd harmonics, which provides a comparatively cleaner square wave relative to primary digital signal 200A. In both examples, the period of the equivalent square wave is 10 nanoseconds (ns) at the carrier frequency. Although the negative pulses of primary digital signals 200A and 200B are clipped to show more detail, XCVR 89 may, in some examples, refrain from clipping the negative pulses of primary digital signals 200A and 200B.

XCVR 89 may then insert or otherwise superimpose a data authentication pulse (which may also be referred to as a "secondary digital signal") on top of at least one of the one or more pulses forming the pulse train to obtain an encrypted communication signal. In some examples, XCVR 89 superimposes a relatively small amplitude, exponentially damped sinusoid within one or more of the pulses of the primary digital signal, thereby utilizing a higher frequency portion of the communications spectrum to potentially provide another layer of cyber protection in a communication channel.

Figure 5:
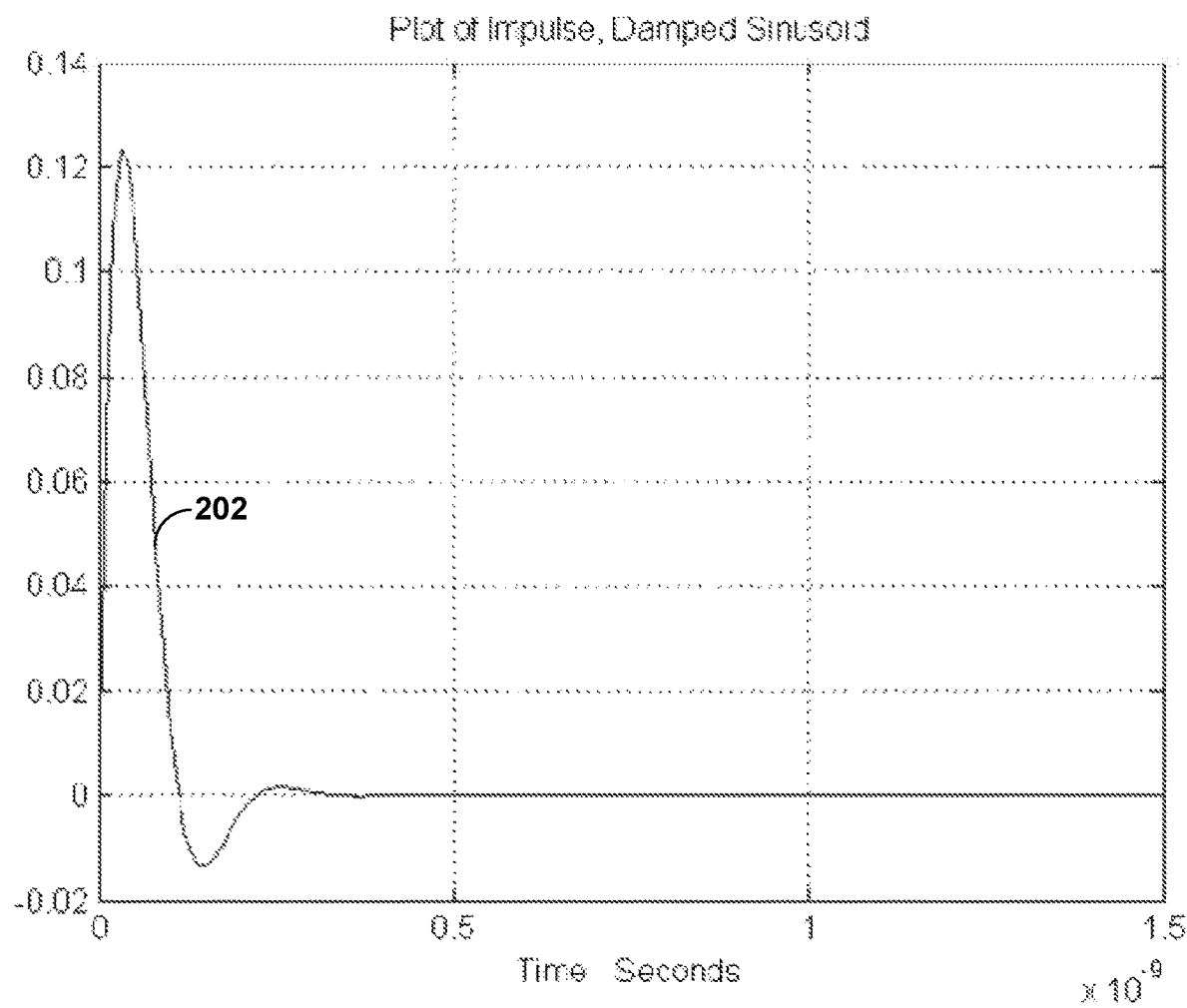
FIG. 5 is a graph illustrating an example of the secondary digital signal generated in accordance with various aspects of the frequency encryption techniques set forth in this disclosure.

FIG. 5 is a graph illustrating an example of the secondary digital signal generated in accordance with various aspects of the frequency encryption techniques set forth in this disclosure. In the example of FIG. 5, the graph shows a secondary digital signal 202 having a signal amplitude of approximately 0.12 volts (V) and a pulse duration of about 0.25 ns with a frequency of the sinusoid being approximately 4.5 gigahertz (GHz). XCVR 89 may utilize secondary digital signal 202 in combination with one or more other forms of encryption, such as pseudo-random frequency hopping or cryptographic data signatures.

Figure 6:
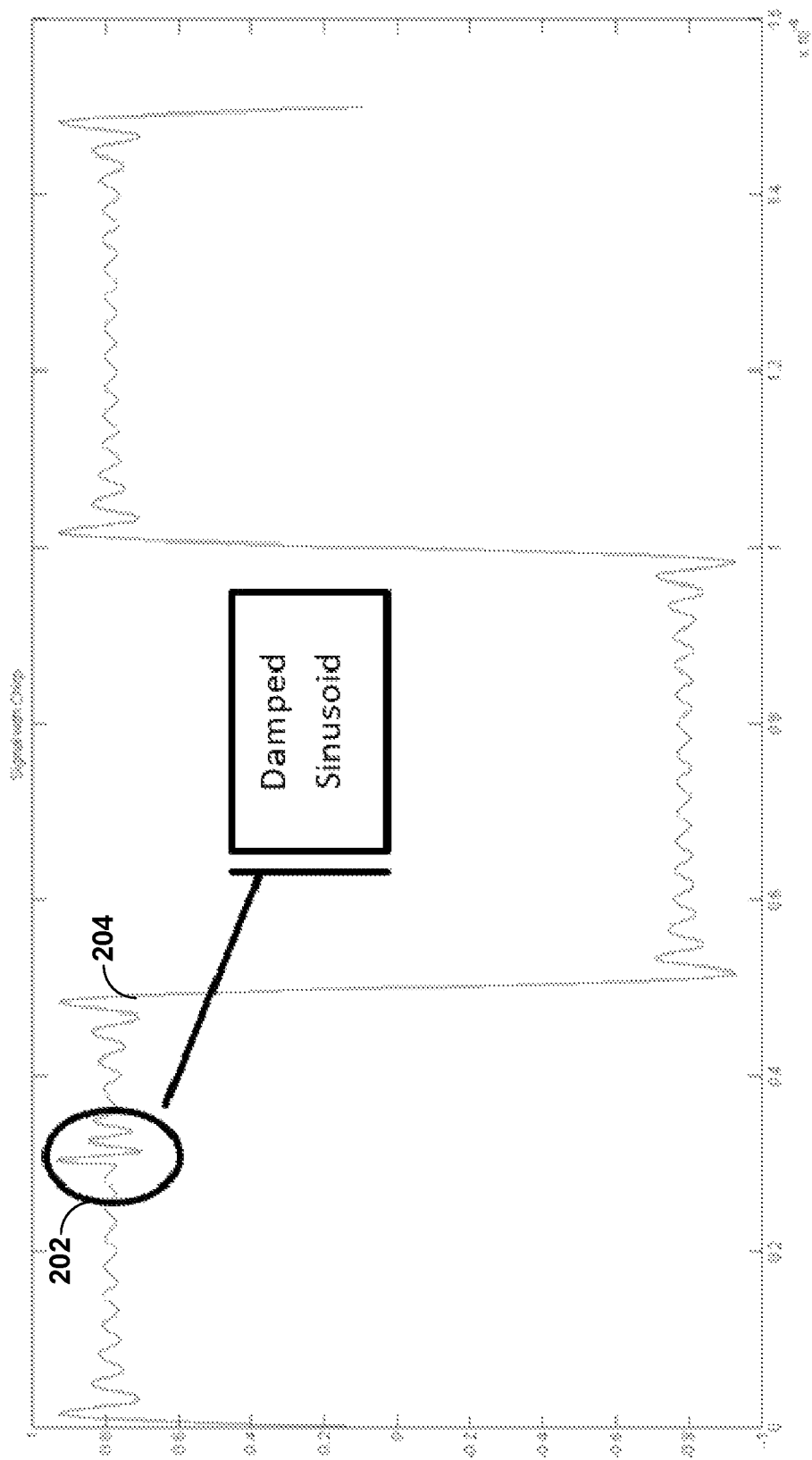
FIG. 6 is a graph illustrating an example of an encrypted communication signal generated in accordance with various aspects of the frequency encryption techniques set forth in this disclosure.
Figure 7:
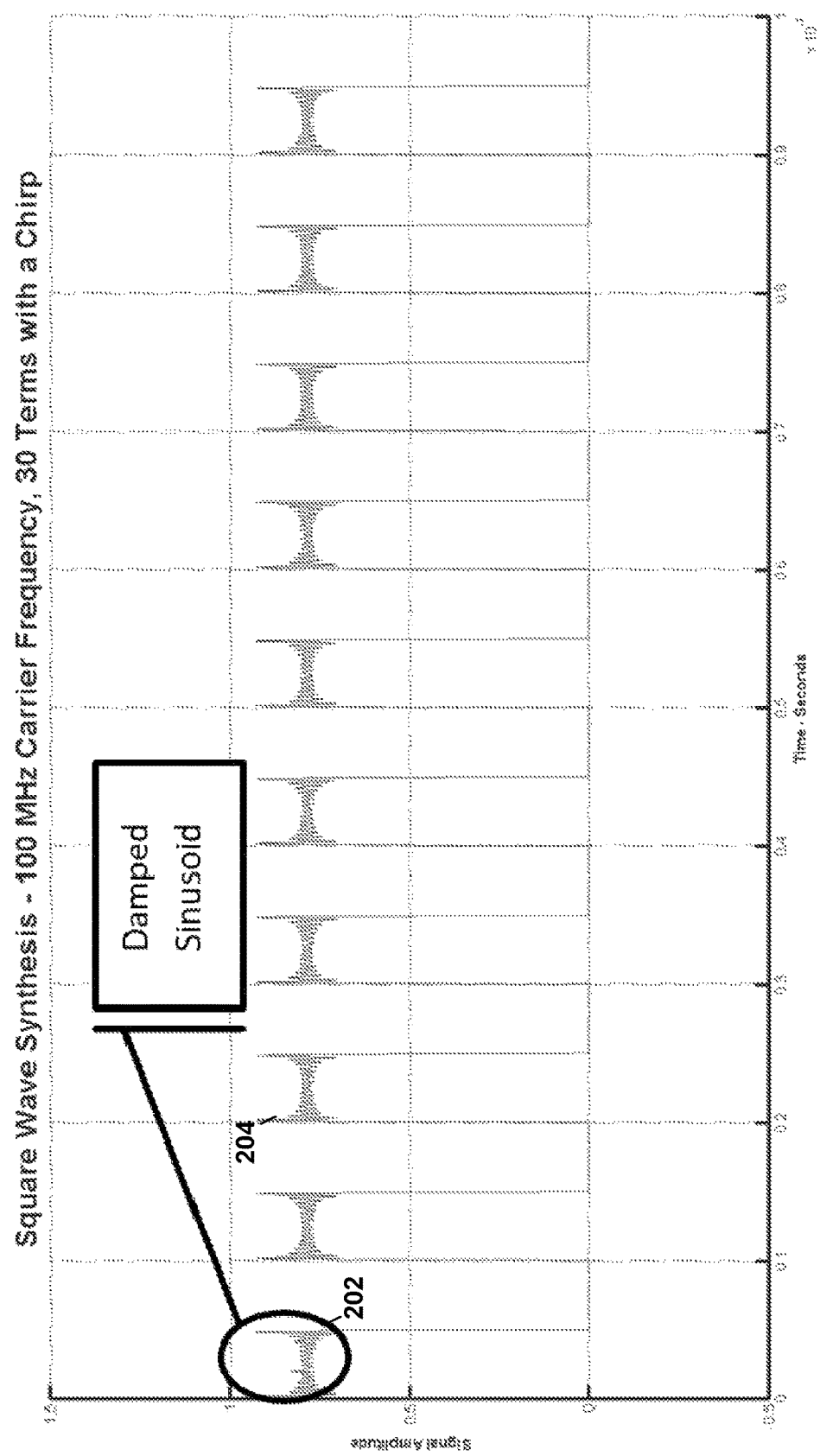
FIG. 7 is a graph illustrating an example of the encrypted communication signal of FIG. 6 as viewed in the context of a larger pulse train.

FIG. 6 is a graph illustrating an example of an encrypted communication signal generated in accordance with various aspects of the frequency encryption techniques set forth in this disclosure. As shown in the example of FIG. 6, the encrypted communication signal 204 includes secondary digital signal, which can be observed in the graph shown in the example of FIG. 6 when the amplitude of secondary digital signal 202 is set sufficiently high. Encrypted communication signal 204 may include synthesized square waves with the damped sinusoid (which is one example of secondary digital signal 202) inserted at approximately 25 ns within the first pulse. Secondary digital signal 202 is visible in the graph shown in the example of FIG. 6 because secondary digital signal 202 has a 0.120 voltage amplitude. FIG. 7 is a graph illustrating an example of the encrypted communication signal of FIG. 6 as viewed in the context of a larger pulse train.

To further reduce detection of secondary digital signal 204, XCVR 89 may specify secondary digital signal 202 using an amplitude (such as approximately 0.025 V) that is at least one order of magnitude (e.g., 10 times, 100 times, or 1000 times) less than the amplitude of primary digital signal 200A or 200B. In this way, XCVR 89 may effectively hide or, in other words, encrypt secondary digital signal 202

(which may be referred to as an "impulse 202") into the first pulse of (in this example) primary digital signal 200A.

Figure 8:
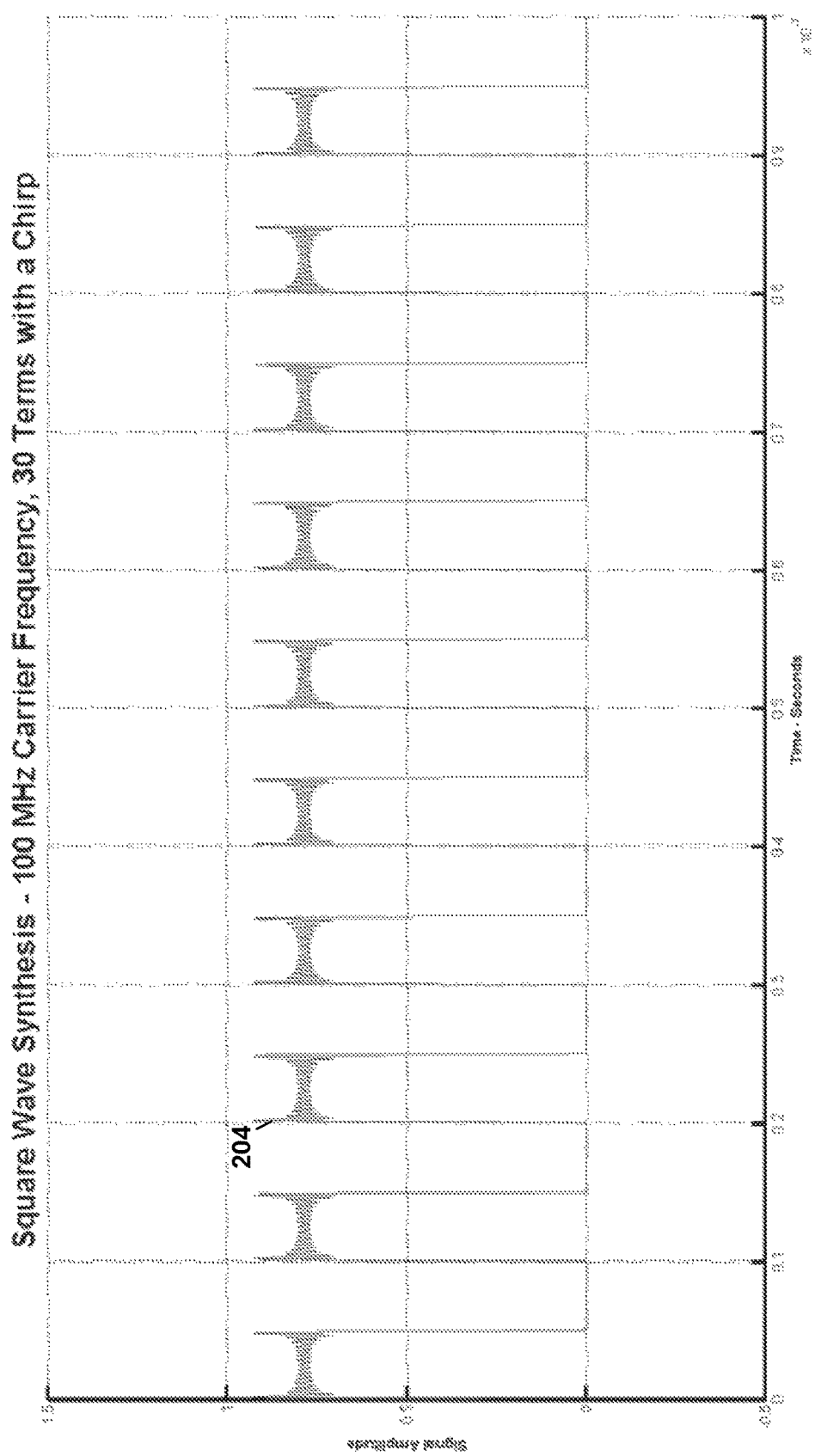
FIG. 8 is a graph illustrating an example of the encrypted communication signal where the amplitude of the secondary digital signal is at least one order of magnitude less than the amplitude of the primary digital signal.

FIG. 8 is a graph illustrating an example of the encrypted communication signal where the amplitude of the secondary digital signal is at least one order of magnitude less than the amplitude of the primary digital signal. In the example of FIG. 8, the amplitude of secondary digital signal 202 is reduced such that secondary digital signal 202 is no longer easily identifiable within encrypted communication signal 204. To execute this function, XCVR 89 generates a pulse train comprised of integral data bits transmitted at this frequency. With the addition of the damped sinusoid within the data packet (represented by the pulse train), XCVR 89 may provide a single bit or multiple bit data within each data packet to provide an extra layer of validation for each data packet.

Figure 9:
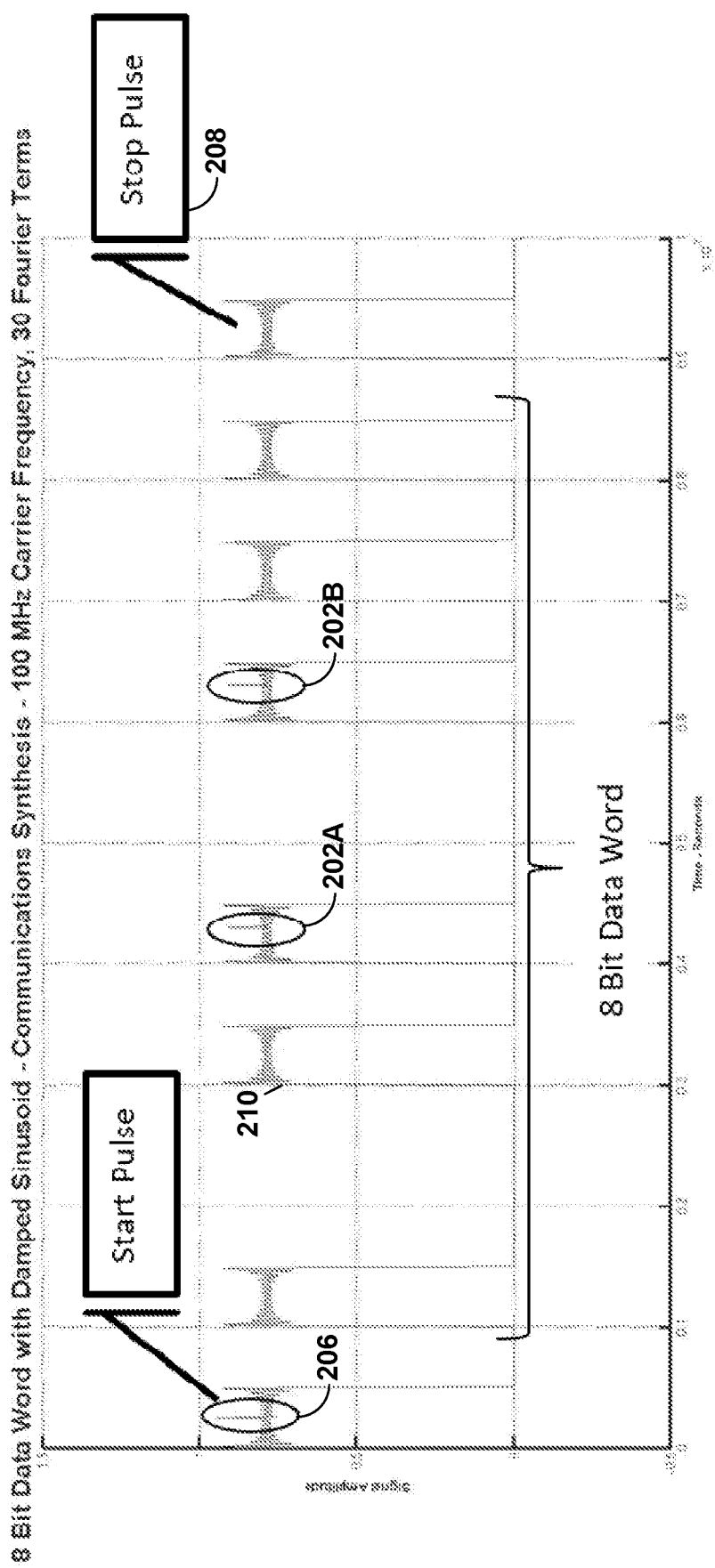
FIG. 9 is a graph illustrating an example of an encrypted communication signal generated, according to various aspects of the techniques described in this disclosure, to include multiple secondary digital signals.

FIG. 9 is a graph illustrating an example of an encrypted communication signal generated, according to various aspects of the techniques described in this disclosure, to include multiple secondary digital signals. In the example of FIG. 9, the graph shows an encrypted communication signal 210 that includes a start pulse 206 (which may be similar if not the same as secondary digital signals 202 described above) followed by an 8-bit word in which two pulses include secondary digital signals 202A and 202B, and concluding with a stop pulse 208. While the amplitudes of the various pulses 202A, 202B, and 206 have been increased to approximately 0.35V so as to expose where the encryption pulses can be located, XCVR 89 may use voltage amplitudes at least an order of magnitude less than the amplitude of the underlying carrier signal to mask any secondary digital pulses (including start pulse 206 and possibly stop pulse 208).

Returning back to the example of FIG. 2, XCVR 89 may, in this way, insert these secondary digital signals 202 (or, in other words, data authentication pulses 202) into communication signal 200 (which may generally refer to any of example communication signals 200A and 200B as well as other examples) to obtain encrypted communication signal 204. In an effort to potentially reduce detection, XCVR 89 may vary frequencies and amplitudes of data authentication pulses 202 according to a pseudo random sequence, and/or pulse location within communication signal 200 in which data authentication pulses 202 are inserted according to the pseudo random sequence.

In this respect, XCVR 89 may superimpose, according to the pseudo random sequence, data authentication pulse 202 into the one or more pulses of communication signal 200. Further, the data authentication pulse may be adaptable in terms of one or more of frequency, amplitude, and dampening factor (and to some extent potentially based on the pseudo random sequence).

XCVR 89 may insert data authentication pulses 202 so as to potentially enable transmission of encrypted data with authentication (or, in other words, a hidden key in the form of data authentication pulses 202). XCVR 89 may further use data authentication pulses 202 to transmit authentication code as hidden data (e.g., a cryptographic signature), which may be optimum for real time control systems.

While described above with respect to an exponentially dampened sinusoids, XCVR 89 may use other types of pulses, including a truncated sinusoid and/or chirp signals. XCVR 89 may, in some examples, use a combination of different types of pulses, where a start pulse may include one of the above types of pulses, data authentication pulses may include a different one of the above types of pulses, and the stop pulse including yet another different one of the above types of pulses or possible the same type as one of the other types of pulses. Alternatively or in combination with the above, XCVR 89 may, in some examples, use a combination of different amplitudes, dampening factors, and the like for the different start, data authentication, and stop pulses.

In any event, XCVR 89 may transmit encrypted communication signal 204 (or 210) to XCVR 79, which may receive encrypted communication signal 204/210. XCVR 79 may determine whether data authentication pulse 202 has been superimposed over at least one of the one or more pulses. To determine whether data authentication pulse 202 has been superimposed over at least one of the one or more pulses, XCVR 79 may apply a frequency filter to obtain a subset of frequency components present in the one or more pulses. As one example, the frequency filter may include an infinite impulse response (IIR) filter. XCVR 79 may next determine whether the data authentication pulse has been superimposed within the subset of the frequency components.

XCVR 79 may, as an example, employ a Goertzel algorithm to determine whether data authentication pulse 202 is present in one or more pulses of encrypted communication signal 204/210. The Goertzel algorithm may refer to a potentially efficient algorithm that computes the equivalent output of a single fast Fourier transform (FFT) frequency bin at a specified frequency (or frequency band). The Goertzel algorithm may provide some advantages by calculating only the frequencies required rather than all the frequencies computed in an FFT.

As such, for a single frequency filter output, the Goertzel algorithm results in computation that is O(N) rather than O(NlogN) (referring to big-O notation common in the computer science arts). The Goertzel algorithm may provide additional advantages by computing what is essentially a complex finite impulse response (FIR) filter result using a real second order IIR filter structure, potentially saving on coefficient storage and unnecessary complex operations compared to implementation of the complex FIR filter. The IIR filter structure has poles on the unit circle so that the IIR filter impulse response is a pure tone, forming an FIR filter similar to a single FFT bin output if the output is truncated to a finite time.

XCVR 79 may, as an alternative to the Goertzel algorithm, employ a chirp Z transform to determine whether data authentication pulse 202 is present in one or more pulses of encrypted communication signal 204/210. When the data signals used are exponentially damped sinusoids rather than truncated tones, the chirp Z transform may be more appropriate than the FFT as a mechanism to search many frequencies at once, because the chirp Z transform operates on a series of related damped sinusoids rather than harmonically related tones. Although efficient algorithms for computing the chirp Z transform are available, if the data frequencies and damping ratios are known in advance, a Goertzel-like approach may be more efficient for a small number of frequencies. Selecting a real second order IIR filter with poles that match the desired data pulse in frequency and damping ratio and operating the filter for a truncated time period would efficiently implement a matched FIR filter for the data pulse. In some instances, to achieve the time-reversal needed for a true matched filter behavior, the IIR filter may be unstable, but because the IIR filter may be truncated in time and effectively implement an FIR result, the IIR filter may not produce unstable behavior.

In this respect, XCVR 79 may apply the frequency filter in accordance with a Goertzel algorithm or a chirp analysis. Regardless of how data authentication pulses 202 are identified, XCVR 79 may authentication, based on the determination of whether the data authentication pulse has been superimposed over at least one of the one or more pulses of encrypted communication signal 204/210. XCVR 79 may decode, responsive to authenticating the one or more pulses as the valid representation of the data, the one or more pulses to obtain the data. XCVR 79 may then, in the example of FIG. 2, control various aspects of the engine system described above based on the underlying data.

Responsive to a failed authentication of the one or more pulses as the valid representation of the data, XCVR 79 may reconfigure the frequency filter to obtain a different subset of the plurality of frequency components. XCVR 79 may communicate an indication of the failed authentication to XCVR 89, which may adapt, responsive to the indication, the generation of an additional data authentication pulse 202. The additional data authentication pulse may differ from previous data authentication pulses 202 in terms of one or more of frequency, amplitude, and dampening factor.

XCVR 89 may superimpose additional data authentication pulses 202 in one or more additional pulses of an additional communication signal 200 to obtain an encrypted additional communication signal 204/210. XCVR 89 may, next, transmit encrypted additional communication signal 204/210.

As such, XCVR 79 may receive additional encrypted communication signal 204/210 including one or more additional pulses representative of additional data. XCVR 79 may apply the reconfigured frequency filter to obtain the different subset of a plurality of frequency components present in the one or more additional pulses. XCVR 79 may then determine whether additional data authentication pulse 202 has been superimposed within the different subset of the frequency components, and authenticate, based on the determination of whether the additional data authentication pulse has been superimposed within the different subset of frequency components, the one or more additional pulses as a valid representation of the additional data.

In this respect, XCVR 79 and XCVR 89 may adapt frequency, amplitudes and dampening factors responsive to detecting a potential cyberattack. As such, a code (referring to one or more data authentication pulses) may be hidden anywhere in the data packet (or, in other words, data word) with respect to time, amplitude and frequency. Further, in the event a hacker or other malicious agent spoofs the system and transmits data, XCVR 79 may detect such intrusion and a time of attack, providing a log or other timeline that may facilitate identification the malicious agents.

Figure 3:
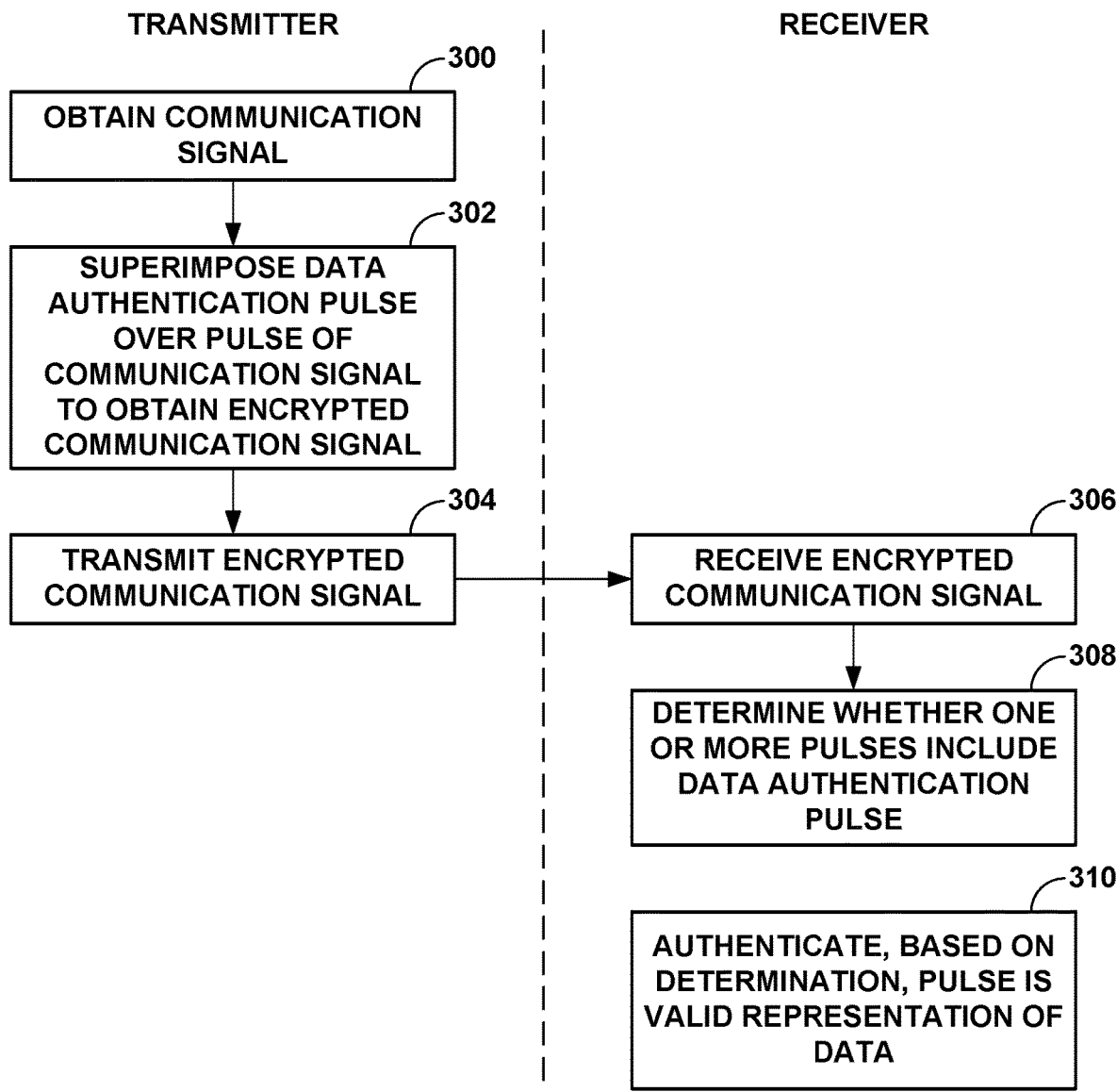
FIG. 3 is a flow diagram illustrating example operations performed by an example optical system that includes an optical receiver and processing circuitry, in accordance with one or more aspects of the present disclosure.

FIG. 3 is a flowchart illustrating example of operation of the system shown in FIG. 2 configured to perform various aspects of the frequency encryption techniques described in this disclosure. As described above, XCVR 89 may generate an encrypted communication signal 204/210 using frequency encryption. Frequency encryption may enable the XCVR 89 to insert, or in other words, add a data authentication pulse 202 of a specified frequency, amplitude and possibly dampening factor to a communication signal 200. XCVR 89 may, in other words, obtain communication signal 200 (300) and superimpose data authentication pulse 202 over at least one or more pulses of communication signal 200 to obtain encrypted communication signal 204/210 (302). XCVR 89 may then transmit the encrypted communication signal to, as one example, XCVR 79 (304).

In this example, XCVR 79 may receive the encrypted communication signal from XCVR 89 (306). XCVR 79 may determine whether the one or more pulses include the data authentication pulse (308). XCVR 79 may authenticate, based on the determination of whether the one or more pulses include the data authentication pulse, the one or more pulses as a valid representation of the data (310). Rather than resort to complicated software-based or software/hardware-based encryption processes that consume significant processing cycles, memory, and other computing resources (including bus bandwidth), the frequency encryption techniques described in this disclosure enable a hardware-based (and possibly entirely hardware-based) encryption that facilitates (relative to existing encryption processes) more rapid encryption and decryption.

Figure 10:
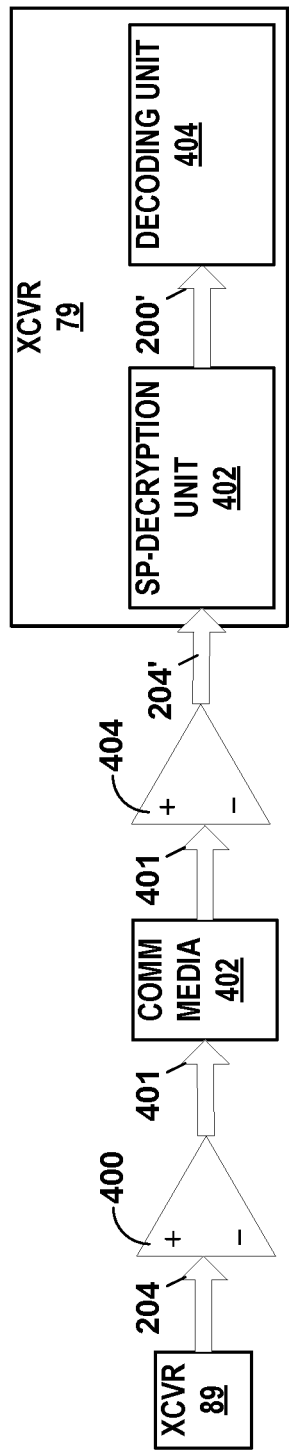
FIG. 10 is a block diagram illustrating, in more detail, the system shown in FIG. 2 that is configured to operate in accordance with various aspects of the frequency encryption techniques.

FIG. 10 is a block diagram illustrating, in more detail, the system shown in FIG. 2 that is configured to operate in accordance with various aspects of the frequency encryption techniques. As shown in the example of FIG. 10, XCVR 89 generates and outputs encrypted communication signal 204 to an amplifier 400. An amplifier 400 of processing circuitry 86 may amplify a gain of encrypted communication signal 204 to obtain amplified encrypted communication signal 401. Amplifier 400 may output amplified encrypted communication signal 401 via communication ("COMM") media 402.

An amplifier 404 of processing circuitry 77 may receive amplified encrypted communication signal 401 and perform inverse amplification to obtain encrypted communication signal 204' (where the prime —'— notation may indicate that encrypted communication signal 204' may not be exactly the same as encrypted communication signal 204 due to noise or other factors common to communication via communication media 402). Amplifier 404 may output encrypted communication signal 204' to XCVR 79.

As shown in the example of FIG. 10, XCVR 79 may include a signal processing and decryption ("SP-DECRYPTION") unit 406 and a decoding unit 408. Signal processing and decryption unit 406 may perform decryption and authentication aspect of the frequency encryption techniques with respect to encrypted communication signal 204' to obtain communication signal 200'. Assuming valid authentication of encrypted communication signal 204', signal processing and decryption unit 402 may output communication signal 200' to decoding unit 404, which may perform additional decoding to obtain the underlying data.

Although described with respect to encryption and decryption, various aspects of the techniques may be implemented using unencrypted data. Once the intrusion is detected, as the potential malicious signals lack the authentication pulse and intrusion is thereby detected, the system may adapt by moving to different frequencies and/or using different signature pulses. As such, in these instances, the techniques may reduce decryption times (as no decryption is necessary), and improve system performance (in terms of speed), as the system is transmitting unencrypted, but digitally authenticated data.

Clause 1. A method comprising: receiving, by a receiver, a communication signal comprising one or more pulses representative of data; determining, by the receiver, whether a data authentication pulse has been superimposed over at least one of the one or more pulses; and authenticating, by the receiver and based on the determination of whether the data authentication pulse has been superimposed over at least one of the one or more pulses, the one or more pulses as a valid representation of the data.

Clause 2. The method of clause 1, wherein the data authentication pulse includes a data authentication pulse having a voltage that is at least one order of magnitude less than a voltage of the one or more pulses representative of the data.

Clause 3. The method of any combination of clauses 1 and 2, wherein determining, by the receiver, whether the data authentication pulse has been superimposed over at least one of the one or more pulses comprises: applying a frequency filter to obtain a subset of a plurality of frequency components present in the one or more pulses; and determining whether the data authentication pulse has been superimposed within the subset of the plurality of frequency components.

Clause 4. The method of clause 3, wherein the frequency filter comprises an infinite impulse response filter.

Clause 5. The method of clause 3, wherein applying the frequency filter comprises applying the frequency filter in accordance with a Goertzel algorithm or a chirp analysis.

Clause 6. The method of clause 3, further comprising: reconfiguring, responsive to a failed authentication of the one or more pulses as the valid representation of the data, the frequency filter to obtain a different subset of the plurality of frequency components; receiving an additional communication signal including one or more additional pulses representative of additional data; applying the reconfigured frequency filter to obtain the different subset of a plurality of frequency components present in the one or more additional pulses; determining whether an additional data authentication pulse has been superimposed within the different subset of the frequency components, the additional data authentication pulse differing from the data authentication pulse in terms of one or more of frequency, amplitude, and dampening factor; and authenticating, based on the determination of whether the additional data authentication pulse has been superimposed within the different subset of frequency components, the one or more additional pulses as a valid representation of the additional data.

Clause 7. The method of any combination of clauses 1-6, wherein determining whether the data authentication pulse has been superimposed over at least one of the one or more pulses comprises determining, according to a pseudo random sequence, whether the data authentication pulse has been superimposed over at least one of the one or more pulses.

Clause 8. The method of any combination of clauses 1-7, wherein the data authentication pulse is adaptable in terms of one or more of frequency, amplitude, and dampening factor and comprises one of a truncated sinusoid, an exponentially damped sinusoid, or a chirp signal.

Clause 9. The method of any combination of clauses 1-8, further comprising decoding, responsive to authenticating the one or more pulses as the valid representation of the data, the one or more pulses to obtain the data.

Clause 10. A receiver in a communication system, the receiver comprising: a buffer configured to store a communication signal comprising one or more pulses representative of data; and hardware configured to: determine whether a data authentication pulse has been superimposed over at least one of the one or more pulses; and authenticate, based on the determination of whether the data authentication pulse has been superimposed over at least one of the one or more pulses, the one or more pulses as a valid representation of the data.

Clause 11. The receiver of clause 10, wherein the data authentication pulse includes a data authentication pulse having a voltage that is at least one order of magnitude less than a voltage of the one or more pulses representative of the data.

Clause 12. The receiver of any combination of clauses 10 and 11, wherein the hardware is configured to: apply a frequency filter to obtain a subset of a plurality of frequency components present in the one or more pulses; and determine whether the data authentication pulse has been superimposed within the subset of the plurality of frequency components.

Clause 13. The receiver of clause 12, wherein the frequency filter comprises an infinite impulse response filter.

Clause 14. The receiver of clause 12, wherein the hardware is configured to apply the frequency filter in accordance with a Goertzel algorithm or a chirp analysis.

Clause 15. The receiver of clause 12, wherein the hardware is further configured to: reconfigure, responsive to a failed authentication of the one or more pulses as the valid representation of the data, the frequency filter to obtain a different subset of the plurality of frequency components; receive an additional communication signal including one or more additional pulses representative of additional data; apply the reconfigured frequency filter to obtain the different subset of a plurality of frequency components present in the one or more additional pulses; determine whether an additional data authentication pulse has been superimposed within the different subset of the frequency components, the additional data authentication pulse differing from the data authentication pulse in terms of one or more of frequency, amplitude, and dampening factor; and authenticate, based on the determination of whether the additional data authentication pulse has been superimposed within the different subset of frequency components, the one or more additional pulses as a valid representation of the additional data.

Clause 16. The receiver of any combination of clauses 10-15, wherein the hardware is configured to determine, according to a pseudo random sequence, whether the data authentication pulse has been superimposed over at least one of the one or more pulses.

Clause 17. The receiver of any combination of clauses 10-16, wherein the data authentication pulse is adaptable in terms of one or more of frequency, amplitude, and dampening factor and comprises one of a truncated sinusoid, an exponentially damped sinusoid, or a chirp signal.

Clause 18. The receiver of any combination of clauses 10-17, wherein the hardware is further configured to decode, responsive to authenticating the one or more pulses as the valid representation of the data, the one or more pulses to obtain the data.

Clause 19. The receiver of any combination of clauses 10-18, wherein an engine control system includes the receiver and a transmitter configured to generate the communication signal in which the data authentication pulse is superimposed over the one or more pulses.

Clause 20. A system comprising: a hardware transmitter configured to: obtain a communication carrier signal that includes one or more pulses representative of data; superimpose, in accordance with a pseudo random sequence, a data authentication signal on top of at least one of the one or more pulses to obtain an encrypted communication signal; and transmit the encrypted communication signal; and a hardware receiver configured to: receive the encrypted communication signal; determine, according to the pseudo random sequence, whether the data authentication pulse has been superimposed over the at least one of the one or more pulses; and authenticate, based on the determination of whether the data authentication pulse has been superimposed over the at least one of the one or more pulses, the one or more pulses as a valid representation of the data.

Clause 21. A method comprising: obtaining, by a transmitter, a communication signal comprising one or more pulses representative of data; superimposing, by the transmitter, a data authentication pulse on top of at least one of the one or more pulses to obtain an encrypted communication signal; and transmitting, by the transmitter, the encrypted communication signal.

Clause 22. The method of clause 21, wherein the data authentication pulse includes a data authentication pulse having a voltage that is at least one order of magnitude less than a voltage of the one or more pulses.

Clause 23. The method of any combination of clauses 21 and 22, further comprising: adapting, responsive to an indication of a failed authentication of the one or more pulses as a valid representation of the data, the generation of an additional data authentication pulse, the additional data authentication pulse differing from the data authentication pulse in terms of one or more of frequency, amplitude, and dampening factor; superimposing the additional data authentication pulse in one or more additional pulses of an additional communication signal to obtain an encrypted additional communication signal; and transmitting the encrypted additional communication signal.

Clause 24. The method of any combination of clauses 21-23, wherein superimposing the data authentication pulse comprises superimposing, according to a pseudo random sequence, the data authentication pulse into the one or more pulses.

Clause 25. The method of any combination of clauses 21-24, wherein the data authentication pulse is adaptable in terms of one or more of frequency, amplitude, and dampening factor and comprises one of a truncated sinusoid, an exponentially damped sinusoid, or a chirp signal.

Clause 26. A transmitter in a communication system, the transmitter comprising: a buffer configured to store an communication signal comprising one or more pulses representative of data; and hardware configured to: superimpose a data authentication pulse on top of at least one of the one or more pulses to obtain an encrypted communication signal; and transmit the encrypted communication signal.

Clause 27. The transmitter of clause 26, wherein the data authentication pulse includes a data authentication pulse having a voltage that is at least one order of magnitude less than a voltage of the one or more pulses.

Clause 28. The transmitter of any combination of clauses 26 and 27, wherein the hardware is further configured to: adapt, responsive to an indication of a failed authentication of the one or more pulses as a valid representation of the data, the generation of an additional data authentication pulse, the additional data authentication pulse differing from the data authentication pulse in terms of one or more of frequency, amplitude, and dampening factor; superimpose the additional data authentication pulse in one or more additional pulses of an additional communication signal to obtain an encrypted additional communication signal; and transmit the encrypted additional communication signal.

Clause 29. The transmitter of any combination of clauses 26-28, wherein the hardware is configured to superimpose, according to a pseudo random sequence, the data authentication pulse into the one or more pulses.

Clause 30. The method of any combination of clauses 26-29, wherein the data authentication pulse is adaptable in terms of one or more of frequency, amplitude, and dampening factor and comprises one of a truncated sinusoid, an exponentially damped sinusoid, or a chirp signal.

Clause 31. The transmitter of any combination of clauses 26-30, wherein an engine control system includes the transmitter and a receiver configured to authenticate the encrypted communication signal.

Various examples have been described. These and other examples are within the scope of the following claims.

What is claimed is:

1. A method comprising:
receiving, by a receiver, a communication signal comprising one or more pulses representative of data;
determining, by the receiver, whether a data authentication pulse has been superimposed over at least one of the one or more pulses, wherein the data authentication pulse includes a data authentication pulse having a voltage that is at least one order of magnitude less than a voltage of the one or more pulses representative of the data; and
authenticating, by the receiver and based on the determination of whether the data authentication pulse has been superimposed over at least one of the one or more pulses, the one or more pulses as a valid representation of the data.

2. The method of claim 1, wherein determining, by the receiver, whether the data authentication pulse has been superimposed over at least one of the one or more pulses comprises:
applying a frequency filter to obtain a subset of a plurality of frequency components present in the one or more pulses; and
determining whether the data authentication pulse has been superimposed within the subset of the plurality of frequency components.

3. The method of claim 2, wherein the frequency filter comprises an infinite impulse response filter.

4. The method of claim 2, wherein applying the frequency filter comprises applying the frequency filter in accordance with a Goertzel algorithm or a chirp analysis.

5. The method of claim 2, further comprising:
reconfiguring, responsive to a failed authentication of the one or more pulses as the valid representation of the data, the frequency filter to obtain a different subset of the plurality of frequency components;
receiving an additional communication signal including one or more additional pulses representative of additional data;
applying the reconfigured frequency filter to obtain the different subset of a plurality of frequency components present in the one or more additional pulses;
determining whether an additional data authentication pulse has been superimposed within the different subset of the frequency components, the additional data authentication pulse differing from the data authentication pulse in terms of one or more of frequency, amplitude, and dampening factor; and
authenticating, based on the determination of whether the additional data authentication pulse has been superimposed within the different subset of frequency components, the one or more additional pulses as a valid representation of the additional data.

6. The method of claim 1, wherein determining whether the data authentication pulse has been superimposed over at least one of the one or more pulses comprises determining, according to a pseudo random sequence, whether the data authentication pulse has been superimposed over at least one of the one or more pulses.

7. The method of claim 1, wherein the data authentication pulse is adaptable in terms of one or more of frequency, amplitude, and dampening factor and comprises one of a truncated sinusoid, an exponentially damped sinusoid, or a chirp signal.

8. The method of claim 1, further comprising decoding, responsive to authenticating the one or more pulses as the valid representation of the data, the one or more pulses to obtain the data.

9. A receiver in a communication system, the receiver comprising:
a buffer configured to store a communication signal comprising one or more pulses representative of data; and
hardware configured to:
determine whether a data authentication pulse has been superimposed over at least one of the one or more pulses, wherein the data authentication pulse includes a data authentication pulse having a voltage that is at least one order of magnitude less than a voltage of the one or more pulses representative of the data; and
authenticate, based on the determination of whether the data authentication pulse has been superimposed over at least one of the one or more pulses, the one or more pulses as a valid representation of the data.

10. The receiver of claim 9, wherein the hardware is configured to:
apply a frequency filter to obtain a subset of a plurality of frequency components present in the one or more pulses; and
determine whether the data authentication pulse has been superimposed within the subset of the plurality of frequency components.

11. The receiver of claim 10, wherein the frequency filter comprises an infinite impulse response filter.

12. The receiver of claim 10, wherein the hardware is configured to apply the frequency filter in accordance with a Goertzel algorithm or a chirp analysis.

13. The receiver of claim 10, wherein the hardware is further configured to:
reconfigure, responsive to a failed authentication of the one or more pulses as the valid representation of the data, the frequency filter to obtain a different subset of the plurality of frequency components;
receive an additional communication signal including one or more additional pulses representative of additional data;
apply the reconfigured frequency filter to obtain the different subset of a plurality of frequency components present in the one or more additional pulses;
determine whether an additional data authentication pulse has been superimposed within the different subset of the frequency components, the additional data authentication pulse differing from the data authentication pulse in terms of one or more of frequency, amplitude, and dampening factor; and
authenticate, based on the determination of whether the additional data authentication pulse has been superimposed within the different subset of frequency components, the one or more additional pulses as a valid representation of the additional data.

14. The receiver of claim 9, wherein the hardware is configured to determine, according to a pseudo random sequence, whether the data authentication pulse has been superimposed over at least one of the one or more pulses.

15. The receiver of claim 9, wherein the data authentication pulse is adaptable in terms of one or more of frequency, amplitude, and dampening factor and comprises one of a truncated sinusoid, an exponentially damped sinusoid, or a chirp signal.

16. The receiver of claim 9, wherein the hardware is further configured to decode, responsive to authenticating the one or more pulses as the valid representation of the data, the one or more pulses to obtain the data.

17. The receiver of claim 9, wherein an engine control system includes the receiver and a transmitter configured to generate the communication signal in which the data authentication pulse is superimposed over the one or more pulses.

18. A system comprising:
a hardware transmitter configured to:
obtain a communication carrier signal that includes one or more pulses representative of data;
superimpose, in accordance with a pseudo random sequence, a data authentication pulse on top of at least one of the one or more pulses to obtain an encrypted communication signal, wherein the data authentication pulse includes a data authentication pulse having a voltage that is at least one order of magnitude less than a voltage of the one or more pulses representative of the data; and
transmit the encrypted communication signal; and
a hardware receiver configured to:
receive the encrypted communication signal;
determine, according to the pseudo random sequence, whether the data authentication pulse has been superimposed over the at least one of the one or more pulses; and
authenticate, based on the determination of whether the data authentication pulse has been superimposed over the at least one of the one or more pulses, the one or more pulses as a valid representation of the data.

* * * * *